United States Patent
Kimura

[15] 3,699,718
[45] Oct. 24, 1972

[54] PACKING STRIP STRUCTURE
[72] Inventor: Yoh Kimura, Hiroshima-ken, Japan
[73] Assignee: Nishikawa Rubber Co., Ltd., Hiroshima-ken, Japan
[22] Filed: Jan. 18, 1971
[21] Appl. No.: 107,370

[30] Foreign Application Priority Data
Jan. 22, 1970  Japan .......................45/5530

[52] U.S. Cl. .................................................49/491
[51] Int. Cl. ...............................................E06b 7/16
[58] Field of Search....................277/35, 36, 44–51, 277/12, 205, 206; 49/490, 491, 492

[56] References Cited

UNITED STATES PATENTS

| | | | |
|---|---|---|---|
| 3,108,338 | 10/1963 | Stec et al. | 49/490 X |
| 3,165,793 | 1/1965 | Lynch | 49/141 |
| 1,938,648 | 12/1933 | Victor et al. | 277/47 |
| 2,076,715 | 4/1937 | Fretter | 277/48 |
| 2,826,441 | 3/1958 | Niessen | 277/205 |
| 3,138,942 | 6/1964 | Kayser | 277/205 |

FOREIGN PATENTS OR APPLICATIONS

| | | | |
|---|---|---|---|
| 603,332 | 8/1960 | Canada | 49/491 |
| 694,835 | 9/1964 | Canada | 49/490 |
| 1,095,178 | 12/1967 | Great Britain | 49/491 |

*Primary Examiner*—William F. O'Dea
*Assistant Examiner*—Robert I. Smith
*Attorney*—James E. Armstrong and Ronald S. Cornell

[57] ABSTRACT

A packing strip structure is provided in which an opening of a packing member receives at least one mounting member comprising a plurality of tongue-bearing rectangular-sections connected together and bent generally into a U-shape. The mounting member is positioned and arranged so that the packing strip structure can bend freely laterally and longitudinally and otherwise, in various arcs and in various ways, to achieve maximum conformity and to adaptability for use with various edge flanges or other parts on which the structure is to be mounted.

10 Claims, 10 Drawing Figures

PACKING STRIP STRUCTURE

BACKGROUND OF THE INVENTION

This invention relates to packing strip structures and more particularly, to packing strip structures for embracing engagement with and clamping retention on edge flanges or other parts, such as those of automobile bodies or trucks, for trimming, sealing or other purposes.

An object of this invention is to provide an improved packing strip structure which increases the clamping retention on edge flanges and will not be displaced by the application of a external force.

SUMMARY

The packing strip structure of the invention comprises a mounting member which is placed in engaging relationship into an opening of a packing member. At both side portions of the mounting member are positioned inwardly projecting and oppositely directed tongues, the lips of which approach near or are in contiguous relationship with the oppositely positioned tongue. The packing member has integral tips at the edge of the opening which encase the edges of and bear against the inner surfaces of the mounting member.

When the packing strip structure is mounted on a flange, for example, the edge of an opening and closing portion of a box, e.g., a trunk, by inserting the flange between the lips of the opening and forcing it into between the tongues of each rectangular section, the passage of the flange between the tongues causes the tongues to open and to hold the flange. Both lower ends of the mounting member approach each other inwardly to an extent corresponding to the extent of opening of the tongues to urge the lips against the inner surfaces of the flange, thereby increasing the clamping retention of the packing strip to the flange. Furthermore, as an external force is applied to the portion offset from the mounting portion of the packing strip structure, the structure is supported by the corresponding tongue and end portions of the mounting member and bears against said external force, thereby securely retaining the position of the packing strip structure and preventing it from being offset due to said external force.

BRIEF DESCRIPTION OF THE DRAWINGS

The invention will be readily understood from the following description, when read together with the drawings, wherein.

DETAILED DESCRIPTION

Figure 1:
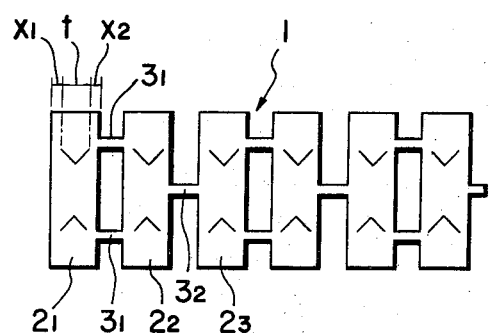
FIG. 1 is an extended plan view of a mounting member according to the invention.
Figure 2:
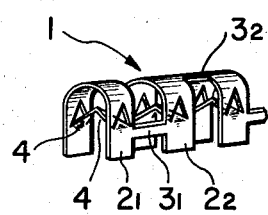
FIG. 2 is a perspective view of a mounting member bent into a U-shape form.

Referring now to FIG. 1 and FIG. 2, mounting member 1 is formed of a sheet of metal and shaped as shown. Said member comprises a plurality of rectangular sections $2_1$, $2_2$, $2_3$ . . . connected together by connecting bands in such a manner that adjacent rectangular sections $2_1$ and $2_2$ are connected by two connecting bands $3_1$, $3_1$ to form a doubly connected pair of sections and the sections $2_2$ and $2_3$ are connected by a single connecting band $3_2$, section $2_3$ being the first section of the next pair of sections. Each of the rectangular sections $2_1$, $2_2$, $2_3$ . . . is provided at both of its side portions with inwardly directed tongues 4, 4 formed by cutting or punching these portions.

Width t of the base portion of each tongue 4 is greater than the combination of the width $x_1$ between the one end of the base portion and one side edge of the rectangular section and the width $x_2$ between the other end of the base portion and the other side edge of the section; namely, $t > x_1 + x_2$.

Mounting member 1 is bent around its longitudinal axis into a U-shape as shown in FIG. 2 and tongues 4, 4 are projected inwardly with the tips of the tongues 4, 4 of each section positioned opposite and directed toward each other so as to approach near or to come into contiguous relationship with the oppositely positioned tongue.

Figure 3:
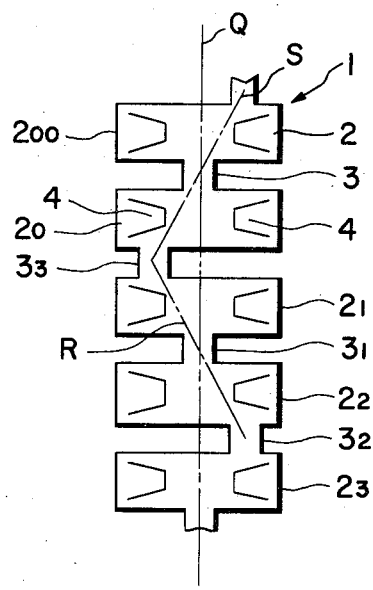
FIG. 3 is an extended plan view of another embodiment of a mounting member.
Figure 4:
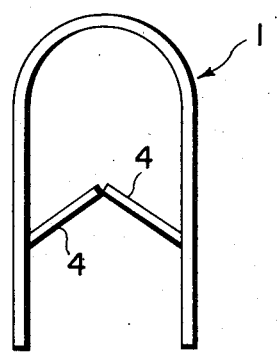
FIG. 4 is a sectional view of the mounting member of FIG. 3.

In FIGS. 3 and 4, a modified form of a mounting member is shown, in which rectangular sections $2_1$ and $2_2$ are connected by a single connecting band $3_1$ on a longitudinal axis Q of the member, sections $2_2$ and $2_3$ are connected by single connecting band $3_2$ on the right hand side of said axis Q, and sections $2_1$ and $2_0$ are connected by single connecting band $3_3$ on the left hand side of said axis Q. These bands $3_1$, $3_2$, $3_3$ are on a straight line R intersecting said axis Q in the center of band $3_1$, and rectangular sections $2_1$, $2_0$, $2_{00}$ are connected by connecting bands which lie on a straight line S intersecting said axis Q and extending in an opposite direction from the direction of line R. As in the previous embodiment, each of said rectangular sections is provided at both of its side portions with tongues 4, 4.

The mounting member is bent around its longitudinal axis into a U-shape form and tongues 4, 4 of each section are projected inwardly, the tips of the corresponding tongues being positioned opposite and directed toward each other.

Figure 5:
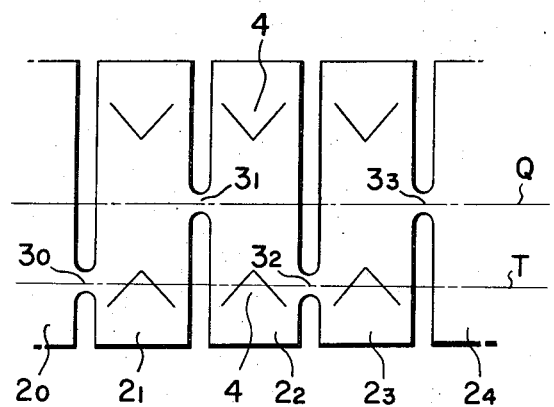
FIG. 5 is an extended plan view of still another embodiment of a mounting member.

Another embodiment of a mounting member is shown in FIG. 5 in which rectangular sections $2_1$ and $2_2$ are connected by single connecting portion $3_1$ on the longitudinal axis Q of the member, sections $2_2$ and $2_3$ are connected by single connecting portion $3_2$, sections $2_3$ and $2_4$ are connected by connecting portion $3_3$ on the longitudinal axis Q of the member and sections $2_1$ and $2_0$ are connected by a connecting portion $3_0$. Connecting portions $3_0$, $3_2$ are located on a straight line T parallel to the axis Q.

As in the other embodiments, tongues 4, 4 are formed by cutting or punching angular slits at both side portions of said each section, mounting member 1 is bent around its longitudinal axis member into a U- shape and the tongues 4, 4 of each section are projected inwardly, positioned opposite, and directed toward each other.

Figure 6:
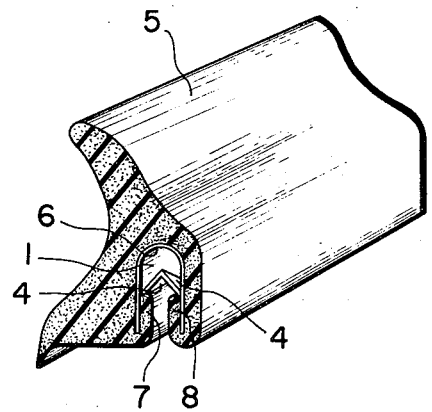
FIG. 6 is a perspective view of the packing strip structure according to the invention.

The mounting member thus formed is secured in engaging relationship in opening 6 in packing member 5, which is formed of resilient material, such as a natural or synthetic rubber sponge, a natural or synthetic rubber latex sponge, or foam material such as urethane foam, as shown in FIG. 6, to form the packing strip structure.

Packing member 5 is provided at both lower sides of opening 6 with integral overlapping lip portions 7, 8 which are adapted to encase the ends of and to bear against the inner surfaces of rectangular sections $2_1$, $2_2$, $2_3$ . . . when mounting member 1 is inserted into opening 6.

Figure 7:
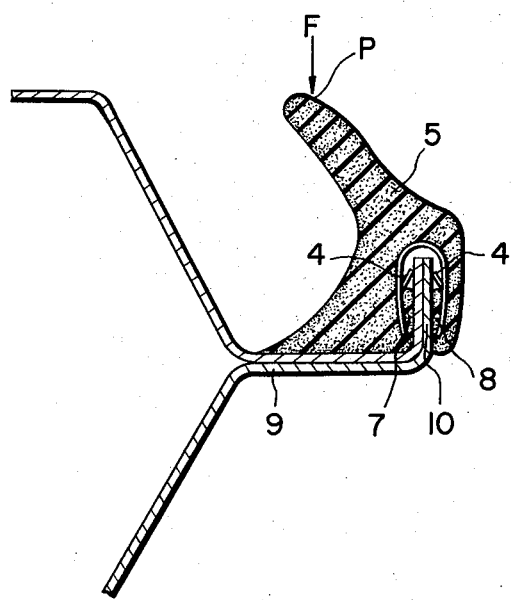
FIG. 7 is a section of the packing strip structure which is mounted on a flange of a door of a vehicle.
Figures 8A, 8B, 8C:
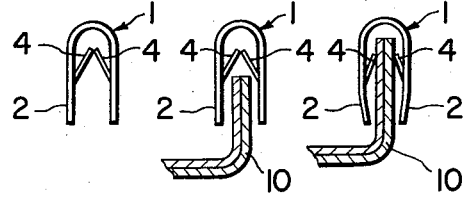
FIGS. 8A, 8B and 8C are schematic sequential views of a mounting member, FIG. 8A showing the member prior to mounting on a flange, FIG. 8B showing a flange partially inserted into the member, and FIG. 8C showing the flange completely inserted into the member.

The packing strip structure thus formed as shown in FIG. 7, for example, is adapted to be mounted on a support 9 of a door, mounting being accomplished by inserting flange 10 of support 9 between lip portions 7 and 8 of opening 6. During insertion, since the top part of flange 10 passes over and between tongues 4, 4 of each section, as shown clearly in FIG. 8C, the passage causes the lower ends of the mounting member to move inwardly toward each other. As the ends of the mounting members approach each other, the lip portions 7, 8 bear against both surfaces of flange 10 and at the same time, flange 10 is held resiliently by tongues 4, 4 of each rectangular section.

As shown in FIG. 7, as an external force F is applied against a pressed point P in the closed portion of the door, packing member 5 is supported by the left side tongue 4 abutting against flange 10 and the left side end of the rectangular sections $2_1$, $2_2$, $2_3$ . . . contacting with flange 10 through lip portion 7 and bears against said external force F.

The improved packing strip structure on the invention can be freely bent, laterally and longitudinally and otherwise, in various arcs and in various ways to achieve maximum conformity to and adaptability for use with various edge flanges or other parts on which the structure is to be mounted in use thereof.

What is claimed is:

1. A packing strip structure adapted to be mounted on a flange comprising
    a. at least one mounting member having generally parallel side portions, the side portions bearing a plurality of oppositely positioned and inwardly projecting tongues, and wherein the width of the base portion of each tongue is greater than the combined width of the distances from each end of the base to the adjacent side of the member, whereby upon insertion of a flange which passes over and between said tongues, such passage causes the lower ends of the mounting member to move inwardly toward each other, and
    b. a resilient packing member having an opening adapted to receive said mounting member, the edges of said opening having integral lip portions which encase the ends of the mounting member and bear against a portion of the oppositely positioned inner surfaces thereof.

2. A packing strip structure adapted to be mounted on a flange comprising
    a. a generally U-shaped mounting member consisting of a plurality of adjacently positioned interconnected sections, each of such sections being shaped to form a U and having oppositely positioned and inwardly projecting tongues, the tips of the oppositely positioned tongues approaching each other; and wherein the width of the base portion of each tongue is greater than the combined width of the distances from each end of the base to the adjacent side of the section, whereby upon insertion of a flange, which passes over and between said tongues, such passage causes the lower ends of the mounting member to move inwardly toward each other, and
    b. a resilient packing member having an opening adapted to receive said mounting member, the opposing edges of said opening having integral overlapping lip portions which receive the oppositely positioned ends of said sections.

3. The packing strip structure of claim 2 wherein said packing member is a foam material.

4. The packing strip structure of claim 2 wherein the tips of the oppositely positioned tongues are in contiguous relationship.

5. The packing strip structure of claim 2 wherein two adjacent sections are connected by two spaced apart connecting bands to form a doubly connected pair of sections which, in turn, is joined by a single centrally positioned connecting band to an adjacent doubly connected pair.

6. The packing strip structure of claim 2 wherein each section is connected by a single connecting band to an adjacent section, every other connecting band being centrally positioned along the length of said mounting member.

7. The packing strip structure of claim 6 wherein the non-centrally positioned bands are positioned on the same side of the centrally positioned bands in a straight line along the length of said mounting member.

8. The packing strip structure of claim 6 wherein the non-centrally positioned bands are alternately positioned on opposite sides of said centrally positioned bands.

9. The packing strip structure of claim 2 wherein each section, prior to shaping, is rectangular and has two inwardly directed angular tongues positioned on opposite sides thereof.

10. In combination with a flange for a support, a packing strip structure comprising
    a. a U-shaped mounting member having a plurality of interconnected sections, the sides of said sections being aligned to form oppositely positioned parallel sides of said member, said sides bearing a plurality of oppositely positioned inwardly projecting tongues, the tips of which extend toward each other, and wherein the width of the base portion of each tongue is greater than the combined width of the distances from each end of the base to the adjacent side of the member, whereby upon insertion of a flange which passes over and between said tongues, such passage causes the lower ends of the mounting member to move inwardly toward each other, and
    b. a resilient packing member having an opening to receive said mounting member, the opposing edges of said opening having integral overlapping lip portions which receive the oppositely positioned ends of said sections; the flange on which the packing strip structure is mounted being resiliently held by said tongues and causing separation of the tips of said tongues and movement of the lower side ends of the mounting member toward each other to an extent corresponding to the extent of separation of said tips, thereby increasing the clamping retention of the packing strip structure to the flange.

* * * * *